United States Patent [19]

Sheppard

[11] Patent Number: 5,384,775
[45] Date of Patent: Jan. 24, 1995

[54] APPARATUS FOR, AND METHOD OF, PACKING AND UNPACKING INFORMATION IN TRANSMISSION LINES

[75] Inventor: Thomas C. Sheppard, Simi Valley, Calif.

[73] Assignee: Micom Communications Corp., Simi Valley, Calif.

[21] Appl. No.: 164,057

[22] Filed: Dec. 8, 1993

Related U.S. Application Data

[63] Continuation of Ser. No. 645,211, Jan. 24, 1991, Pat. No. 5,291,487.

[51] Int. Cl.$^6$ .............................................. H04J 3/16
[52] U.S. Cl. ...................................... 370/84; 370/85.6; 370/85.7; 370/99
[58] Field of Search ........................ 370/41, 43, 46, 79, 370/80, 82, 83, 84, 85.6, 85.7, 91, 94.2, 99, 118, 95.1; 341/61, 62, 84, 85, 178

[56] References Cited

U.S. PATENT DOCUMENTS

| | | | |
|---|---|---|---|
| 4,074,074 | 2/1978 | Boutmy et al. | 370/118 |
| 4,494,232 | 1/1985 | Dambrackas | 370/80 |
| 4,581,737 | 4/1986 | Sparrell | 370/118 |
| 4,987,571 | 1/1991 | Haymond et al. | 370/85.6 |
| 5,132,966 | 7/1992 | Hayano et al. | 370/79 |
| 5,150,358 | 9/1992 | Punj et al. | 370/85.6 |

*Primary Examiner*—Benedict V. Safourek
*Attorney, Agent, or Firm*—Ellsworth R. Roston; Charles H. Schwartz

[57] ABSTRACT

Symbols, each having a particular number (e.g. 9) of binary bits in first channels have individual periodicities. A symbol in each channel indicates the start and the periodicity of the symbols in that channel. Another symbol indicates the end of the symbols in that channel. The symbols from each channel are merged into sequential time slots, in a priority dependent upon the symbol periodicities in the different channels. Aperiodic symbols in second channels are merged sequentially into the time slots not occupied by the periodic symbols. Second portions (e.g. 5 bits) of the symbols in groups are provided in character frames without change. The binary bits (e.g. 4) in the first portion of each symbol in each group represent a decimal integer. The resultant decimal value is represented in the character frame by a reduced number (e.g. 10) of binary bits. After transmission, the reduced number of binary bits are converted at a receiver to binary bits representing each decimal integer in the resultant decimal value. The converted bits for each symbol are combined with the bits in the second portion of the symbol to restore the symbol. The time slots for the periodic symbols of each individual periodicity are determined from the start symbol and the periodicity of such symbols. The symbols in the time slots of each individual periodicity are introduced to a separate channel. The aperiodic symbols are introduced to an additional channel.

13 Claims, 7 Drawing Sheets

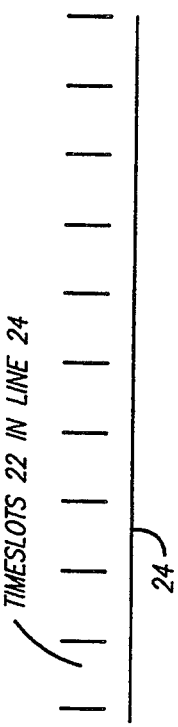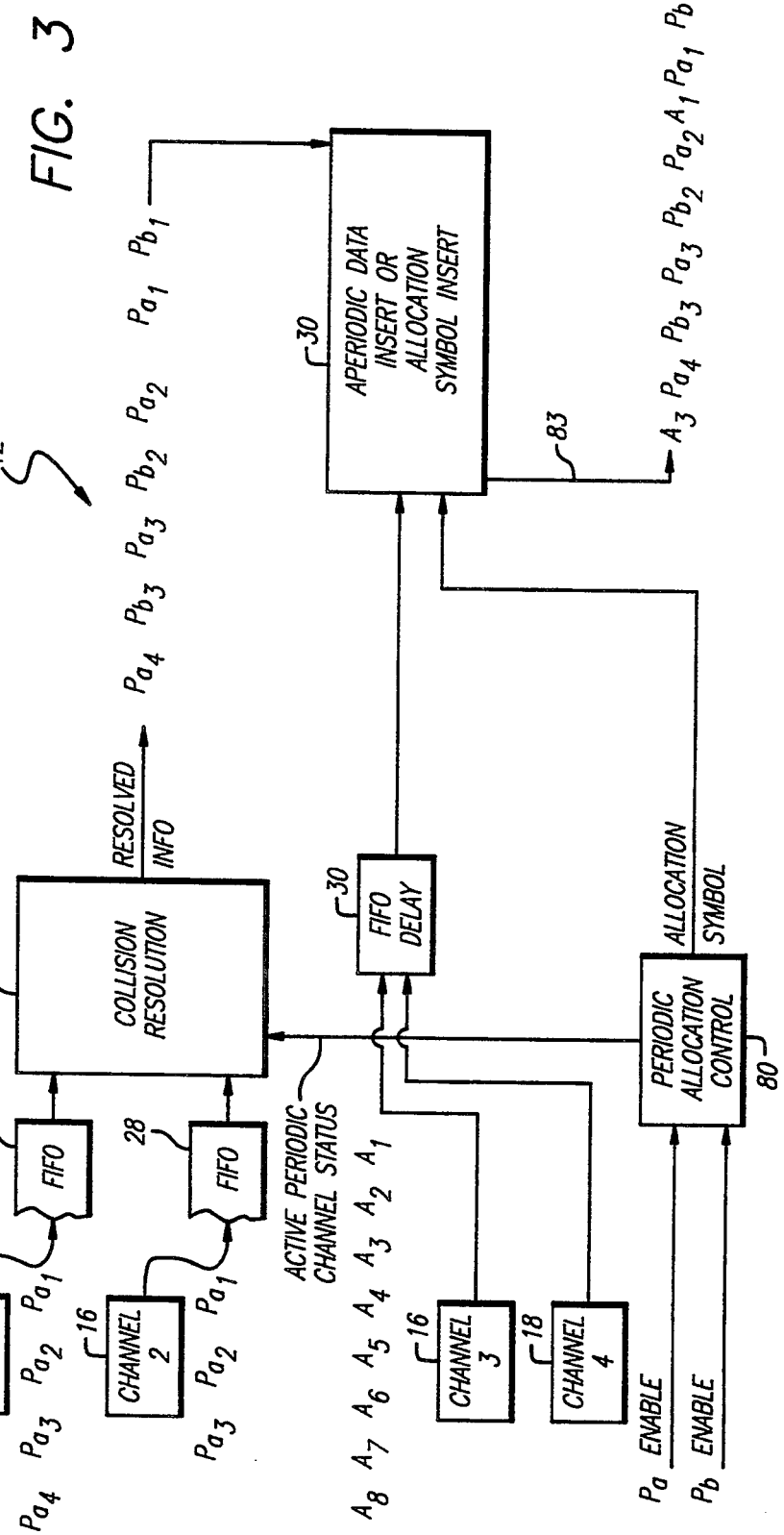

APPARATUS FOR, AND METHOD OF, PACKING AND UNPACKING INFORMATION IN TRANSMISSION LINES

This is a continuation of application Ser. No. 07/645,211 filed Jan. 24, 1991 (now U.S. Pat. No. 5,291,487).

This invention relates to a system for providing an efficient transmission of voice information and data from a transmitter through a transmission line and for the reception and recovery of such information at a receiver. More particularly, the invention relates to a system which enables significantly increased amounts of voice information and data to be transmitted through the transmission line per unit of time and received and restored at the receiver.

As data processing becomes progressively accepted 1 and utilized with the passage of time, the amount of voice information and data to be transmitted through transmission lines increases at a geometric rate. This has taxed the transmission lines and has tended to produce confusion with respect to information in the transmission lines. Although the number of transmission lines has been increased, the increase in the number of transmission lines has tended to fall behind the amount of information to be transmitted through such lines.

Attempts have been made to increase the efficiency at which the voice information and data are transmitted through the transmission lines. For example, spaced packets of information in a channel are transmitted through a transmission line rather than all of the information in a channel. Furthermore, the information in a number of different channels is transmitted on a time-sharing basis through a transmission line. These techniques have alleviated, but have not solved, the problem of excessive demand for the transmission and reception of information in transmission lines relative to the supply of such transmission lines. The excessive demand has continued to exist in spite of the efforts, and considerable significant expenditures money, by many organizations and people to solve the problem.

This invention provides a system for significantly enhancing the efficiency at which voice information and data are transmitted through a transmission line. The system of this invention provides Such an enhanced efficiency by establishing realistic priorities between the information introduced from difference channels to the transmission line. In this way, substantially all of the successive time slots the transmission line are filled with information from the different channels. Furthermore, the information in the transmission line can be processed on a relatively simple basis at the receiver and recovered in different lines corresponding to the individual channels at the transmitter.

The system of this invention also provides an enhanced efficiency by processing the binary information in successive groups of information symbols at the transmitter to form character frames with reduced numbers of binary bits relative to the number of binary bits in the symbols in each of the successive groups. These character frames are then processed at the receiver to restore the binary information in each of the successive symbols in each group. By practicing the improvements described in this paragraph and in the previous paragraph, the system of this invention is able to increase the efficiency in the transmission of information by a factor considerably in excess of ten percent (10%).

In one embodiment of the invention, symbols each having a particular number (e.g. 9) of binary bits in first channels have individual periodicities. A symbol in each channel indicates the start and the periodicity of the symbols in that channel. Another symbol indicates the end of the symbols in that channel. The symbols from each channel are merged into sequential time slots, during the occurrence of the symbols in such channel, in a priority dependent upon the symbol periodicities in the different channels. Aperiodic symbols in second channels are merged sequentially into the time slots not occupied by the periodic symbols.

Second portions (e.g. 5 bits) of the symbols in groups are provided in character frames without change. The binary bits (e.g. 4) in the first portion of each symbol in each group represent a decimal integer with an individual decimal significance. The resultant decimal value is represented in the character frame by a reduced number (e.g. 10) of binary bits.

After transmission, the reduced number of binary bits are converted at a receiver to binary bits representing each decimal integer in the resultant decimal value. The converted bits for each symbol are combined with the bits in the second portion of the symbol to restore the binary bits in the symbol. The time slots for the periodic symbols of each individual periodicity are determined from the start symbol and the symbol periodicity in such channel. The symbols in the time slots of each individual periodicity are introduced to a separate channel. The aperiodic symbols are introduced to an additional channel.

In the drawings:

FIG. 1 is a schematic block diagram of a system constituting one embodiment of the invention for efficiently merging symbols from a plurality of channels into a sequence of time slots in a line at a transmitter and for reducing the number of binary bits in successive groups of symbols at the transmitter and for restoring the symbols at a receiver and demerging the restored symbols at the receiver into individual lines;

FIG. 2 is a diagram schematically illustrating the successive time slots in a transmission line;

FIG. 3 is a schematic block diagram of a subsystem included in the system of FIG. 1 for merging the symbols from the plurality of channels on a priority basis involving a higher priority for periodic symbols than for aperiodic symbols and involving a priority for symbols of different periodicities in accordance with the differences such periodicities;

Figure 1:
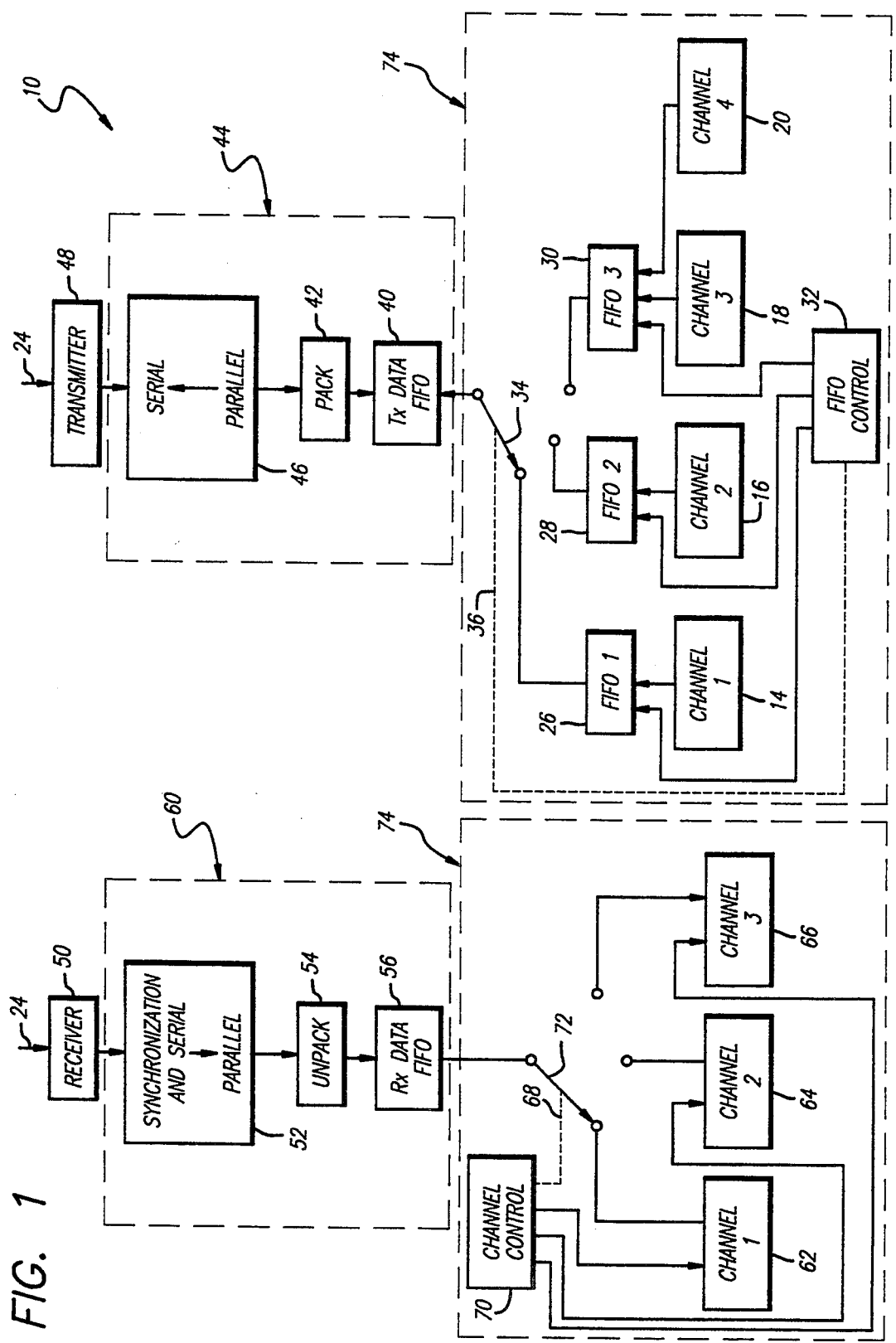

FIG. 1 illustrates in block form a system, generally indicated at 10, constituting one embodiment of the invention in block form. The system 10 includes a sequencer generally indicated in broken lines at 12. The sequencer 12 includes a plurality of channels 14, 16, 18 and 20. Although four (4) channels are shown, it will be appreciated that any number of channels may be provided. The channels 14 and 16 provide periodic symbols and the channels 18 and 20 provide aperiodic symbols. The symbols in each of the channels 14 and 16 are periodic because they occur on a regularly recurring basis. It will be appreciated that a different number than two (2) periodic channels can be provided and that a different number than two (2) aperiodic channels can also be provided.

Each of the symbols in the channels 14, 16, 18 and 20 may be formed from a particular number of binary bits such as nine (9). The symbols in the channel 14 may recur periodically at a rate such that they occupy half of the time slots 22 in a line 24 in FIG. 2. As will be seen, the symbols in the channel 14 appear in alternate time slots 22 in the line 24. Each of the time slots has a time duration sufficient to receive the binary bits in one of the symbols in the lines 14, 16, 18 and 20.

Similarly, the symbols in the channel 16 may have a periodicity equal to one third of the time slots 22 in the line 24. The symbols in each of the channels 18 and 20 occur on an irregular or aperiodic basis. As will be appreciated, the symbols in the channels 14, 16, 18 and 20 should not occur on an aggregate basis more frequently than the capacity of the time slots 22 in the line 24. In the specific example given above for the periodicity of the symbols in the channels 14 and 16, the capacity of the line 24 to provide the symbols from the channels 14, 16, 18 and 20 will not be exceeded if the channels 18 and 20 provide aperiodic symbols on an aggregate basis less than one sixth (1/6) of the time slots 22 in the line 24. However, as will be appreciated, as long as the periodic symbols do not exceed the capacity of the time slots in the line 24, the aperiodic symbols may be retained until such time as the periodic symbols in one or both of the channels 14 and 16 are no longer produced, and the aperiodic symbols in the channels 18 and 20 may then be introduced to the time slots in the line 24.

The sequencer 12 introduces signals into the line 24 from the channels 14, 16, 18 and 20 on a priority basis. For example, the sequencer 12 provides a higher priority to the channels, such as channels 14 and 16, providing symbols on a periodic basis than to the channels, such as the channels 18 and 20, which provide symbols on an aperiodic basis. Furthermore, the sequencer 12 provides individual priorities to the channels with the periodic symbols in accordance with the periodicity (or the rate of occurrence) of the symbols in such channels. Specifically, the higher the rate at which symbols are produced in a specific channel, the higher is the priority which is provided to the symbols in that channel. Thus, the channel 14 has a higher priority than the channel 16.

The symbols from the channels 14 and 16 are respectively introduced to FIFO (first in, first out) stages 26 and 28. Each of the FIFO stages 26 and 28 constitutes in effect a storage member which forms, as a practical matter, a delay line for delaying the passage of symbols and which passes the symbols from the delay line in the same sequence as the symbols are introduced to the delay line. The symbols from the channels 18 and 20 pass to a FIFO stage 30 in the same time sequence as their passage from the channels 18 and 20.

A FIFO control 32 establishes the priority for the passage of symbols from the FIFO stages 26, 28 and 30 in accordance with the priorities discussed above. Thus, when symbols are simultaneously produced in the channels 14 and 16, the priority established by the FIFO control 32 for the channel 14 causes a symbol to pass from the FIFO 26. The symbol from the channel 16 then is introduced to the next time slot 22 in the line 24. Similarly, when symbols are simultaneously produced in the channel 16 and one of the channels 18 and 20, the channel 16 has a priority such that a symbol passes from the FIFO stage 28. The symbol in the FIFO stage 30 then passes to the next available time slot 22 in the line 24. This next available time slot may not be the time slot adjacent to the time slot receiving the symbol from the FIFO 28 because the next symbol from the FIFO stage 26 is introduced to this time slot.

The passage of symbols from the FIFO stages 26, 28 and 30 on a priority basis in accordance with the operation of the FIFO control stage 32 is illustrated schematically in FIG. 1 by a multi-positional switch 34 and by a broken line 36 extending between the FIFO control stage 32 and the movable arm of the switch 34. It will be appreciated that additional details of construction of the FIFO control stage 32 and other stages in the sequencer 12 will be disclosed subsequently in reference to the block diagram shown in FIG. 2.

The sequencer 12 offers certain advantages over the prior art. It assures that substantially all of the time slots 22 in the line 24 will be filled with symbols. This results from the fact that the symbols having reduced priority and occurring simultaneously with symbols of increased priority are delayed from the time of their availability in their respective channels and are introduced to the line 24 for merging into the time slots which would otherwise be vacant. This represents a significant increase in the efficiency of transmission of data through the line 24.

Each of the FIFO stages 26, 28 and 30 stores the binary bits for each symbol in parallel. The symbols selected in sequence from the FIFO stages 26, 28 and 30 on a priority basis in accordance with the operation of the FIFO control stage 32 are introduced in such sequence to a transmitter data FIFO stage 40. The FIFO 40 stores the binary bits for each symbol in parallel and introduces such bits in parallel to a pack stage 42. The FIFO stage 40 and the pack stage 42 are included in a data bit reducer generally indicated at 44 as by broken lines.

As previously indicated, each symbol is indicated by a plurality (such as nine (9)) of binary bits. For a group of three (3) successive symbols, the number of binary bits is twenty seven (27). The pack stage 42 reduces the number of binary bits in each group to twenty five (25) without losing any information in the symbols of each such group. Considering that 27−25=2 binary bits are saved from each group of twenty seven (27) binary bits, this represents a saving of more than seven percent (7%) in the amount of data capable of being transmitted in the line 24.

The twenty five (25) bits representing each group of three (3) symbols may be considered to constitute a character frame. The binary bits in each character frame are provided in parallel in the pack stage 42 and are introduced to a stage 46 for converting the parallel bits in each character frame to a parallel-to-serial converter 46. The stage 46 may be considered to be included in the data bit reducer 44. The serial signals from the converter 46 are in turn introduced to a transmitter 48 (which may include an amplifier) for passage through the transmission line 24.

Each symbol of nine (9) binary bits represents either user information or control information. User information in a symbol is represented by a binary "0" in the last of the nine (9) binary bits in the symbol and control information in the symbol is represented by a binary "1" in the last of the nine (9) binary bits in the symbol. When the last of the nine (9) binary bits in a symbol is a binary "0", user information in the symbol is indicated by the eight (8) preceding binary bits. The user information may accordingly have a decimal value between "0" and "255". When the last of the nine (9) binary bits in a symbol is a binary "1", the control information in the symbol is indicated by the first (6) binary bits.

The first six (6) binary bits in a control symbol provide a decimal indication between "0" and "63". Each of these decimal values represents a different type of control. For example, one binary number having a decimal value between "0" and "63" may represent the start of the symbols in a channel and another binary number having a second decimal value between "0" and "63" may represent the end of the symbols in a channel. Since user information is represented by decimal values between "0" and "255" control information may be considered to be represented between 256 and 256+63=319.

The reduction in the number of binary bits in each character frame is obtained in the pack stage 42 by providing the first five (5) binary bits of the three (3) symbols in each group without any change. The last four (4) bits in each symbol represent, in binary form, a symbol having a decimal value between "0" and "9" with one (1) exception. Excluding this one (1) exception, the last four (4) binary bits in a symbol involving user information is able to represent a decimal value between "0" and "7" because the last binary bit in the symbol is "0". The last four (4) binary bits in a symbol involving control information can represent decimal values between "8" and "9" even though the last binary bit is a "1" because the seventh (7th) and eighth (8th) binary bits in the symbol have no control significance and can accordingly be a binary "0".

As discussed above, the last four (4) bits in each symbol in a group represent a decimal integer between "0" and "9". The last four (4) binary bits in the first symbol each group represent a decimal integer with a weighted significance in the hundreds; the last four (4) binary bits in the second symbol in each group represent a decimal integer with a weighted significance in the tens; and the last four (4) bits in the third symbol in the group represent a decimal integer with a weighted significance in units.

For example, when the last four (4) bits in the first, second and third symbols in a group respectively represent decimal integers of "9", "7" and "3" the resultant decimal value represented by these groups is "973".

This decimal value of "973" is converted to a binary representation in ten (10) binary bits of the decimal value of "973". This corresponds to a binary indication of 1111001101 where the least significant bit is at the right. The ten (10) binary bits representing the last four (4) bits in each of the three (3) symbols in a group are merged with the fifteen (15) binary bits representing the first five (5) bits in each of the symbols in the group to form the character frame of twenty five (25) binary bits.

The one exception specified above is when the last four (4) bits in each of the three (3) symbols in a group represent a decimal value of "1023". This occurs when all of the ten (10) bits representing this portion of the three (3) symbols in the group have a binary value of "1". When this occurs, the character frame indicates that a synchronizing signal is being produced. This synchronizing signal synchronizes the operation of a receiver 50 in FIG. 1 with the operation of the transmitter 48. Actually, all of the decimal values between "1000" and "1023" can represent special circumstances or special instructions in a manner similar to the use of the decimal value "1023" to provide synchronization.

The sequence of character frames in the line 24 is received by the receiver 50. As previously discussed, each of the character frames is represented by a sequence of twenty five (25) binary bits. The serial presentation of binary bits in each character frame is synchronized in a serial-to-parallel converter 52 and is converted in the converter into a parallel representation of the twenty five (25) binary bits for each character frame. The parallel bits in each character frame are then introduced to an unpack stage 54.

The unpack stage 54 converts the last ten (10) binary bits in each character frame into the last four (4) binary bits for each of the three (3) symbols in the group defined by such character frame. The unpack stage 54 accomplishes this by initially dividing the decimal value in the last ten (10) bits of the character frame by a decimal value of one hundred (100) to obtain a quotient having a decimal integer corresponding to the decimal value of the four (4) bits in the first portion of the last symbol in the group. For example, in the example discussed above, the decimal value of "973" is divided by a decimal value of one hundred (100) to obtain a decimal integer of "9" represented by four (4) binary bits. This decimal value is represented by binary indications of 1001 and these binary indications are combined with the five (5) binary bits in the first portion of the symbol to restore the nine (9) bits in the symbol.

In like manner, the remainder in the quotient after the division discussed in the previous paragraph is divided by ten (10) to determine the decimal values, in binary form, of the first portions of the second and third symbols defined by the character frame. The integer in the quotient represents the decimal value of the four (4) binary bits in the last portion of the second symbol defined by the character frame. The remainder in the quotient represents the decimal value of the four (4) binary bits in the last portion of the third symbol defined by the character frame.

For example, when the decimal value is "973" the remainder after the division by one hundred (100) is "73". This remainder is divided by ten (10) to obtain a decimal value of "7" for the first portion of the secondary symbol defined by the character frame. This is represented by a binary pattern of 0111 where the least significant bit is at the right. These binary bits are combined with the five (5) binary bits in the first portion of the symbol to restore the nine (9) binary bits in the symbol. In like manner, the last portion of the third symbol defined by the character frame has a decimal value of "3". This decimal value is represented in binary form as 0011 where the least significant bit is at the right. These binary bits are combined with the five (5) binary bits in the first portion of the symbol to restore the nine (9) binary bits in the symbol.

The twenty seven (27) bits produced in the unpack stage 54 for each group of three (3) symbols are introduced to a receiver data FIFO stage 56. The serial-to-parallel converter 50, the unpack stage 52, the FIFO stage 54 and the receiver data FIFO stage 56 may be considered to be included in a data bit expander shown in broken lines in FIG. 1 and indicated generally at 60.

The symbols stored in the FIFO stage 56 are processed in a sequencer, generally indicated at 74 in broken lines, to restore the separation of the successive symbols into a plurality of different channels 62, 64 and 66 respectively corresponding to the channels 14 and 16 and to the combination of the channels 18 and 20. The channel 62 receives the symbols originally in the channel 14 and the channel 64 receives the symbols originally in the channel 16. The channel 66 receives the symbols originally in the chambers 18 and 20. The separation of the successive symbols into the channels 62, 64 and 66 is under the control of a channel control stage 70 which processes the binary bits defining each character frame in the FIFO stage 56 to activate an individual one of the channels 62, 64 and 66. The activation of an individual one of the channels is indicated schematically by a multi-position switch 72 and the control of this switch is indicated by a broken line 68 between the switch and the channel control stage. The channels 62, 64 and 66, the channel control stage 72 and the switch 68 may be considered to be included in the sequencer 74.

FIG. 3 illustrates the operation of the sequencer 12 of FIG. 1 in additional detail with particular reference to a specific example. In FIG. 3, the channel 14 provides in the FIFO 26 a sequence of periodic symbols $P_{a1}$, $P_{a2}$, $P_{a3}$, $P_{a4}$, etc. The rate of these symbols is one half ($\frac{1}{2}$) of the available time slots 22 in the line 24. In other words, these symbols occur in alternate ones of the time slots 22 in the line 24. The channel 16 provides in the FIFO 28 a sequence of periodic symbols $P_{b1}$, $P_{b2}$, $P_{b3}$, $P_{b4}$, etc. The rate of these symbols is one third ($\frac{1}{3}$). In other words, these symbols would normally occur in every third time slot 22 in the line 24. The channels 18 and 20 provide in the FIFO 30 aperiodic symbols having a sequence $A_1$, $A_2$, $A_3$, $A_4$, etc. The sequence of symbols $A_1$, $A_2$, $A_3$, $A_4$, etc. represents a merging into the FIFO 30 of the symbols in each of the channels 18 and 20 in the cumulative order; from a time standpoint, in which the symbols appear in the channels 18 and 20.

When the first symbol appears in the channel 14, it constitutes an enable symbol for the sequence of symbols $P_{a1}$, $P_{a2}$, $P_{a3}$, etc., which follow subsequently in the channel. This enable symbol also indicates the periodicity of the symbols $P_{a1}$, $P_{a2}$, $P_{a3}$, etc. This enable symbol is designated as the "$P_a$" symbol in FIGS. 3 and 4. It is introduced to a periodic allocation control stage 80 in FIG. 3. Similarly, the first symbol ($P_b$ in FIGS. 3 and 4) in the channel 16 constitutes an enable symbol for the sequence of symbols $P_{b1}$, $P_{b2}$, $P_{a3}$, etc., which follow subsequently in the channel. The enable symbol $P_b$ in the channel 16 also indicates the start and the periodicity of the symbols $P_{b1}$, $P_{b2}$, $P_{a3}$, etc. The enable symbols $P_b$ is also introduced to the allocation control stage 80 in FIG. 3. In the example of FIG. 3, the enable symbol $P_b$ is shown as being produced after the enable signal $P_a$.

The enable signals $P_a$ and $P_b$ pass through the periodic allocation control stage 80 to a stage 82 which is designated as "Aperiodic data insert or allocation symbol insert". The enable signals pass through the stage 82 to line 83 for introduction to the transmitter data FIFO 40 in FIG. 1. The enable signals $P_a$ and $P_b$ also activate the periodic allocation control stage 80 to generate signals representing the rates at which the symbols in the channels 14 and 16 are respectively being produced. These signals are introduced to the stage 82 to have the Stage 82 reserve the proper time slots in the line 83 for the periodic symbols in the channels 14 and 16.

The signals introduced to the stage 82 from the periodic allocation control stage 80 also indicate when there are blank time slots in the line 24. These blank time slots occur when there is no allocation of time slots in the line 24 for the periodic signals in the channels 14 and 16. The aperiodic symbols in the delay FIFO 30 are accordingly introduced into these blank time slots in the line 83.

The periodic allocation control stage 80 also produces a signal which is introduced to a collision resolution stage 84 to control the operation of that stage. The stage 84 receives the periodic symbols $P_{a1}$, $P_{a2}$, $P_{a3}$, etc. in the FIFO 26 (also shown in FIG. 1) and the periodic symbols $P_{b1}$, $P_{b2}$, $P_{b3}$, etc. in the FIFO 28 (also shown in FIG. 1). The signal from the periodic allocation control stage 80 controls the priority to be allocated to one of the $P_a$ symbols over one of the $P_b$ symbols when both symbols occur simultaneously.

FIG. 3 shows, at the input side of the collision resolution stage 84, the relative times of occurrence of successive ones of the $P_a$ and $P_b$ symbols before the resolution of any conflicts between the simultaneous occurrence of $P_a$ and $P_b$ symbols. FIG. 3 also shows, at the output side of the collision resolution stage 84, the sequence of the $P_a$ and $P_b$ symbols after any conflicts between the simultaneous occurrence of $P_a$ and $P_b$ symbols have been resolved. FIG. 3 also shows the sequence of the $P_a$, $P_b$ and A symbols in the line 83 after the operation of the stage 82 in allocating the successive time slots 22 in the line 83 to sequences of the $P_a$ and $P_b$ symbols and, by default, in allocating time slots to the aperiodic A symbols.

Figure 4:
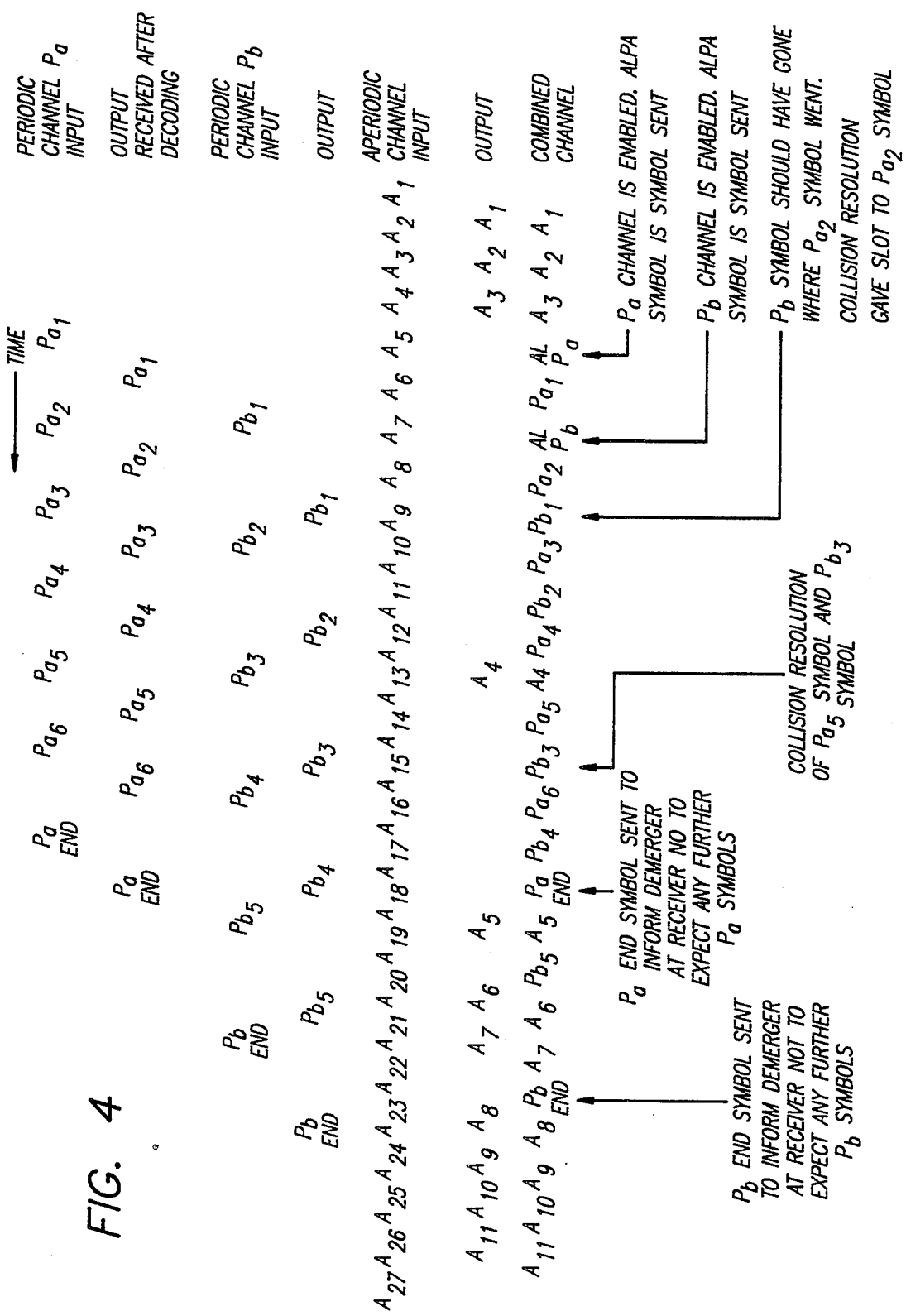
FIG. 4 is a schematic diagram illustrating a particular example in which periodic symbols of different periodicities and aperiodic symbols are efficiently merged into the successive time slots in a transmission line, explanations being given as to the existence of conflicts and the resolution of the different conflicts in accordance with the established priorities.

FIG. 4 illustrates the relative times of occurrence of the $P_a$, $P_b$ and A symbols and further shows the allocation of these symbols to the time slots 22 in the line 83 in FIG. 3. FIG. 4 also shows the merging of these symbols to fill all of the successive time slots 22 in the line 83. FIG. 4 also shows the positions where the enable symbols are allocated in the time slots 22 in the line 83 for each of the sequences of the $P_a$ and $P_b$ symbols. FIG. 4 further illustrates when conflicts occur between the simultaneous appearance of $P_a$ and $P_b$ symbols and how these conflicts are resolved by the stage 84 in FIG. 3. FIG. 4 also indicates when symbols indicating the end of the $P_a$ sequence and the $P_b$ sequence appear in the time slots 22 in the line 83 and how the ends of these sequence affect the subsequent insertion of the aperiodic A symbols into the time slots 22 in the line 24. These end symbols pass through the collision resolution stage 84 and the stage 82 to the line 83.

Figure 5:
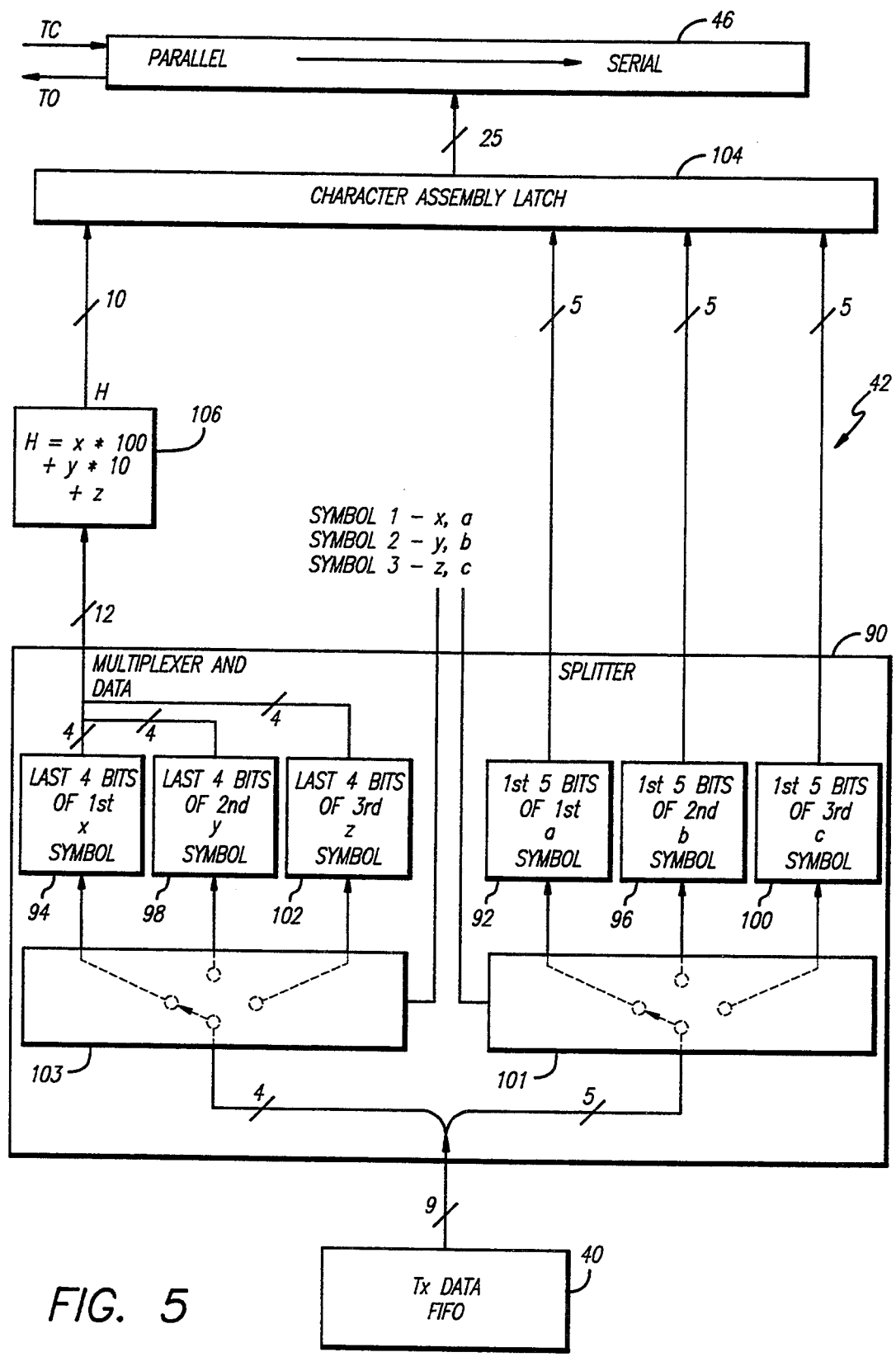
FIG. 5 is a schematic block diagram of a subsystem included in the system of FIG. 1 for packing groups of symbols into character frames each having a reduced number of binary bits compared to the total number of binary bits in the symbols in the related group.
Figure 6:
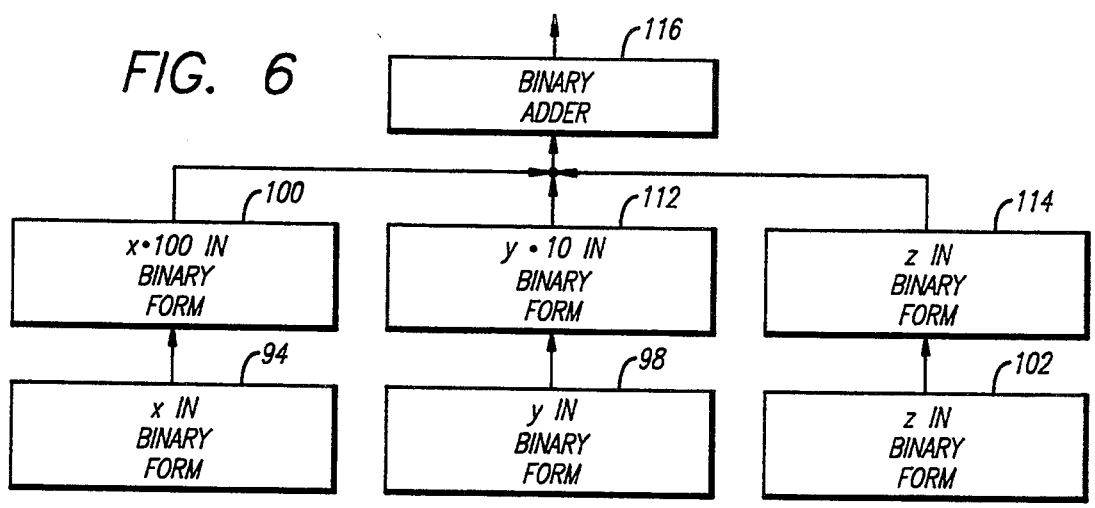
FIG. 6 is a schematic block diagram showing a portion of the sub-system of FIG. 5 in additional detail.

FIGS. 5 and 6 illustrate the construction of the pack stage 42 of FIG. 1 in additional detail. As shown in FIG. 5, the nine (9) binary bits in each symbol in a group are introduced in parallel from the transmitter FIFO 40 (also shown in FIG. 1) to a multiplexer and data splitter 90. The multiplexer and data splitter 90 separates the nine (9) bits in the first symbol in the group so that the first five (5bits are transferred to registers 92 and the last four (4) bits in the group are transferred to registers 94. Similarly, the first five (5bits in the second symbol in the group are transferred to registers 96 and the last four (4) bits in such symbol are transferred to registers 98. In like manner, the first five (5) bits in the third symbol in the group are transferred to registers 100 and the last four (4) bits in such symbol are transferred to registers 102. The registers 92, 94, 96, 98, 100 and 102 accordingly hold a total of twenty seven (27) binary bits. The transfer of the first five (5) bits in each of the successive symbols to the registers 92, 96 and 100 is indicated schematically by a switch 101 which is controlled by the multiplexer and data splitter 90. Similarly, the transfer of the last four (4) bits in each of the successive symbols to the registers 94, 98 and 102 is indicated schematically by a switch 103 which is controlled by the multiplexer and data splitter 90. Although the switches 101 and 103 are shown as being mechanical, it will be apparent to a person of ordinary skill in the art that the switches may be provided by logically operated passive electrical components such as gates.

The fifteen (15) bits in the registers 92, 96 and 100 are transferred to fifteen (15) positions in a latch 104 (FIG. 5) without change. The latch 104 may be a plurality 51 of parallel registers. As previously described, the four bits in each of the registers 94, 98 and 102 represent a decimal integer of individual decimal significance. Thus, when the registers 94, 98 and 102 store decimal integers individually indicative of "9", "7" and "3", the registers 94, 98 and 102 cumulatively store a decimal value of "973". This is obtained by (a) transferring the indications in the registers 94 to an arithmetic unit 106 and multiplying this value by one hundred (100), (b) transferring the indications in the registers 98 to the arithmetic unit 106 and multiplying this value by ten (10) and by (c) transferring the indications in the registers 102 to the arithmetic unit 106 without change. The resultant binary indications are added arithmetically in the arithmetic unit 106 to obtain binary indications of ten (10) binary bits in representation of the sum. For example, the ten (10) binary bits represent the decimal value "973" in the above example. The ten (10) binary bits from the arithmetic unit 106 are transferred to the latch 104 to form, with the bits from the registers 92, 96 and 100, a character frame with twenty five (25) binary bits. These binary bits are transferred to the converter 46 (also shown in FIG. 1) to convert the binary bits to a serial form.

FIG. 6 illustrates in additional detail the construction of the arithmetic unit 106 of FIG. 5. As shown in FIG. 6, the binary indications in the register 94 are introduced to a multiplier 110 which multiplies the decimal value of the binary bits by one hundred (100) to obtain a binary indication of the product. Similarly, the binary indications in the register 98 are introduced to a multiplier 112 which multiplies the decimal value of the binary bits by ten (10) to obtain a binary indication of the product. The binary indications in the registers 102 are introduced to registers 114 without change. The binary indications in the multipliers 110, 112 and 114 are added in a binary adder 116 to obtain the ten (10)- bit binary indication of the weighted decimal values in the registers 94, 98 and 102. For example, the ten (10) bits in the adder 116 represent the decimal value "973" in the above example.

Figure 7:
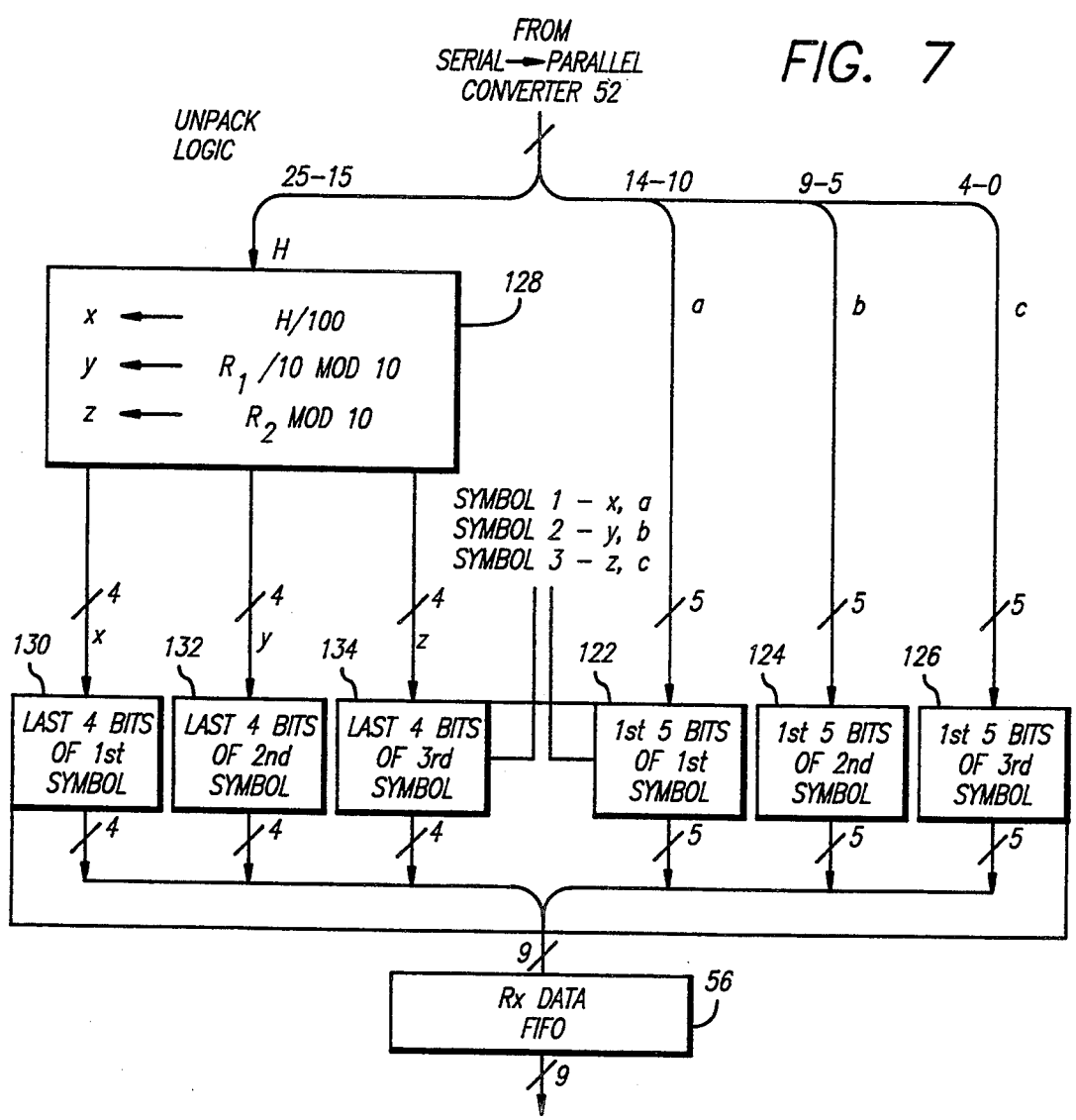
FIG. 7 is a schematic block diagram of a subsystem included in the system of FIG. 1 at the receiver for unpacking each character frame to restore the symbols in each group into pluralities of bits corresponding to the pluralities of binary bits in the symbols at the transmitter.
Figure 8:
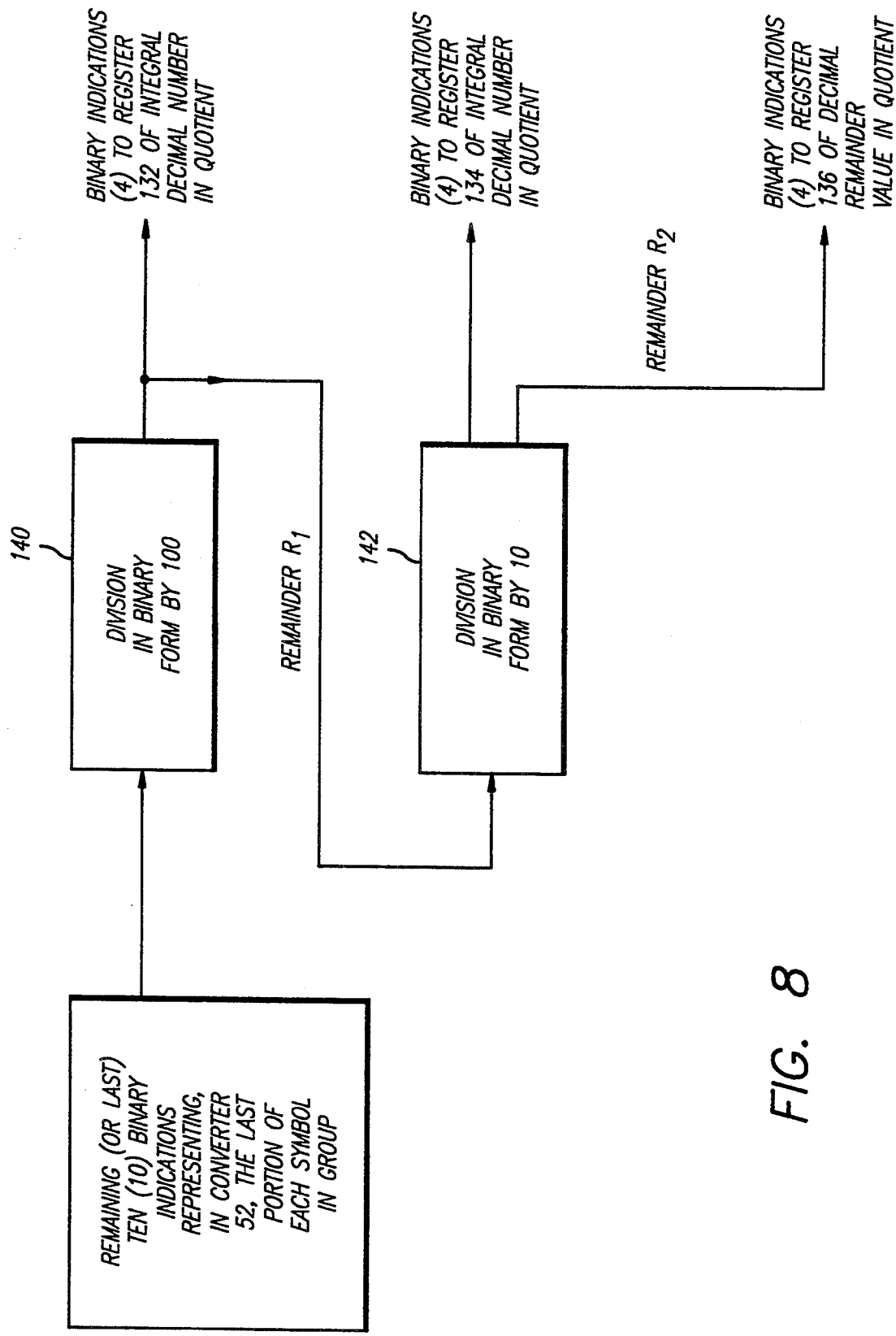
FIG. 8 is a schematic block diagram showing a portion of the sub-system of FIG. 7 in additional detail.

FIGS. 7 and 8 illustrate the construction of the unpack stage 54 in FIG. 1 in additional detail. The first fifteen (15) bits in the parallel output from the converter 52 in FIG. 1 are introduced to registers 122, 124 and 126. The last ten (10) bits in the parallel output from the converter 52 are introduced to an arithmetic unit 128. The arithmetic unit 128 divides the value of these ten (10) binary bits by a divisor of one hundred (100) to obtain four (4) binary bits for introduction to registers 130. These four (4) binary bits represent the decimal integer in the quotient. In the example above, the value of "973" is divided by one hundred (100) to obtain a decimal integer of "9" in the quotient. The binary bits representing this decimal value of "9" are introduced to the registers 130.

Similarly, the arithmetic unit 128 divides the value of the remainder (indicated by the symbol $R_1$) in the previous quotient by a divisor of ten (10) to obtain a decimal integer quotient and a decimal remainder. The four (4) binary bits representing the decimal integer quotient are introduced to registers 132 and the four integers representing the remainder (indicated by the symbol $R_2$) are introduced to registers 134. The remainder from the division by one hundred (100) in the above example is "73". When this value of "73" is divided by ten (10), the decimal integer in binary form introduced to the registers 132 is "7" and the remainder introduced in binary form to the registers 134 is "3". The binary indications in the registers 122, 124 and 126 and in the registers 132, 134 and 136 are introduced to the FIFO 56 (also shown in FIG. 1).

FIG. 8 indicates the arithmetic unit 128 (also shown in FIG. 7) in additional detail. In FIG. 8, the remaining ten (10) binary bits are introduced to a divide stage 140 which divides, by a divisor of one hundred (100), the decimal value represented by the ten (10) binary bits. The resultant decimal integer in the quotient is introduced in binary form to the registers 132 and the decimal remainder ($R_1$) is introduced to a divide stage 142 which divides the decimal remainder by ten (10). The resultant decimal integer in the quotient from the divide stage 142 is introduced in binary form to the registers 134 and the decimal remainder ($R_2$) in the quotient is introduced in binary form to the registers 136. In the above example, the registers 132, 134 and 136 respectively receive decimal values in binary form of "9", "7" and "3".

Figure 9:
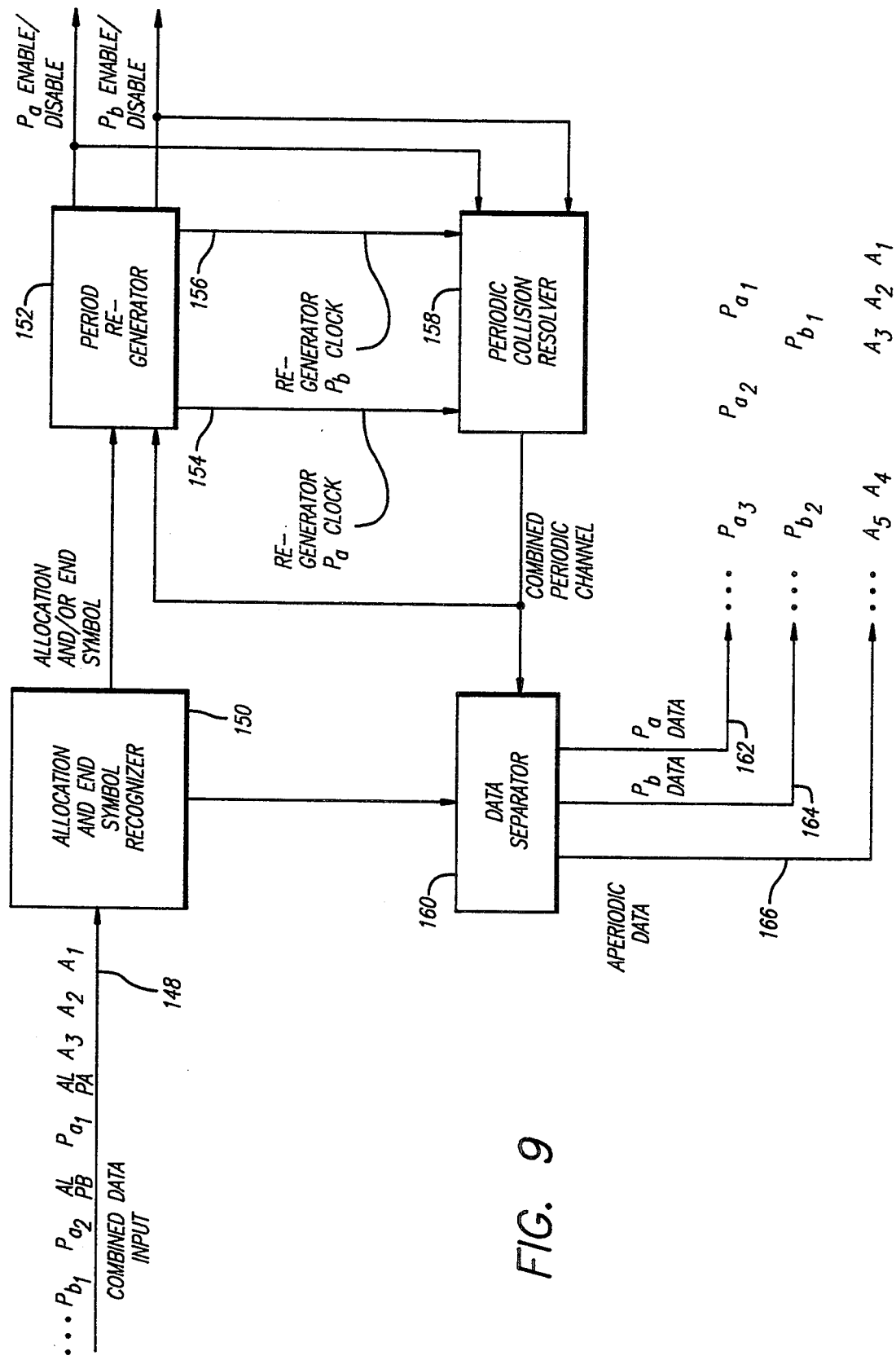
FIG. 9 is a schematic block diagram of a subsystem included in the system of FIG. 1 at the receiver for restoring the symbols in the transmission line to a plurality of lines in the sequence in which they appeared in each of the channels at the transmitter.

FIG. 9 illustrates in additional detail the construction of the sequencer 74 in FIG. 1. As shown in FIG. 9, the sequence of symbols in the time slots 22 are introduced on a line 148 from the FIFO 56 (FIG. 1) to a stage 150 for recognizing the allocation and end symbols in the sequence. As previously described, these symbols are provided in the channels (such as the channels 14 and 16 in FIG. 1) which provide periodic symbols. The allocation symbols for the different channels indicate the start and the periodicity of the periodic symbols in such channels. The end symbols for the different channels indicate the end of the periodic symbols in such channels.

The allocation and end symbols for the channels (such as the channels 14 and 16) with the periodic symbols are introduced to a period regenerator 152. The period regenerator 152 operates upon the allocation symbols to regenerate the clock rate at which the periodic symbols are appearing in the time slots 22 in the line 24. For example, the period regenerator 152 generates first clock signals on a line 154 at a rate corresponding to the rate of occurrence of the symbols designated generally as $P_a$. In the example shown in FIGS. 3 and 4, this rate corresponds to the rate at which alternate ones of the time slots 22 occur in the line 24. These clock signals are generated until the occurrence of the end symbol for the symbols generally designated as $P_a$.

In like manner, the period regenerator 152 generates second clock signals on a line 156 at a rate corresponding to the rate of occurrence of the symbols designated generally as $P_b$. In the example shown in FIGS. 3 and 4, this rate corresponds to the rate at which every third one of the time slots occur in the line 24. These time slots are generated until the occurrence of the end symbol for the symbols generically designated as $P_b$.

The regenerated clock signals on the lines 154 and 156 are introduced to a periodic collision resolver 158. The 29 resolver 158 resolves any collision (or simultaneous occurrence) of the clock symbols on the lines 154 and 156 in favor of the clock signals on the line 154 because these clock signals occur at a higher rate or periodicity than the clock signals on the line 156. The periodic collision resolver 158 specifies the time slots in which the periodic signals $P_a$ and $P_b$ occur, and it further specifies whether each of such time slots is for the $P_a$ or $P_b$ symbols. The periodic collision resolver 158 implicitly identifies the time slots in which the aperiodic symbols occur because it does not specify the occurrence of any periodic symbols for such time slots.

The signals from the periodic collision resolver are introduced back to the period regenerator 152 to respectively regulate the rates of the clock signals on the lines 154 and 156 for the periodic symbols $P_a$ and $P_b$ and assure that the clock signals occur at the proper rate or periodicity. The signals from the periodic collision resolver 158 are also introduced to a data separator 160 to control the separation of the symbols on the line 148 into lines 162, 164 and 166. The symbols are introduced to the data separator 160 through the allocation and end symbol register 150. All of the symbols in the line 148 are introduced to the data separator 160 except for the allocation symbols for the periodic symbols $P_a$ and $P_b$, these allocation symbols having been deleted by the allocation and end symbol recognizer 150.

In response to the signals from the periodic collision resolver 158, the data separator 160 passes the $P_a$ periodic symbols to the line 162, the $P_b$ periodic symbols to the line 164 and the aperiodic symbols to the line 166. As will be appreciated, the periodic symbols $P_a$ in the line 162 have the same time separation as the symbols in the channel 14 of FIG. 1. The periodic symbols in the line 164 also have the same time separation as the symbols in the channel 16 of FIG. 1 except for those symbols which have a time coincidence in the channel 16 with the symbols in the channel 14. However, the aperiodic symbols in the line 166 have a time spacing different from the time spacing of the aperiodic symbols in the channels 18 and 20. Furthermore, all of the aperiodic symbols appear only in the single line 166.

The system described above has certain important advantages. It introduces into a transmission line the symbol from a plurality of channels in such a priority that substantially all of the time slots in the transmission line are filled with symbols and that the symbols can be recovered at a receiver in a plurality of channels corresponding to the channels at the transmitter. The system converts successive groups of symbols in the transmission line into character frames each having a reduced number of binary bits relative to the total number of binary bits in the symbols in the related group. This also increases the efficiency in the transmission of the data represented by the symbols. The packing of the groups of symbols into character frames with reduced numbers of binary bits and the unpacking of these character frames at the receiver to restore the symbols are further advantageous in that they require relatively little processing power. This allows the invention to be implemented on a practical basis in a low cost microprocessor environment.

By providing the efficiencies in transmission as discussed above, voice and data information can be transmitted in the transmission line at a low rate without losing any information when the information is processed and recovered at the receiver. Furthermore, the invention is able to provide the voice information and data on a substantially jitter-free basis in low speed transmission or communication lines.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for providing for the transmission of symbols from a plurality of different channels, a first individual one of the channels providing symbols at a first periodic rate and a second individual one of the channels providing Symbols at a second periodic rate lower than the first periodic rate and a third individual one of the channels providing aperiodic symbols, each of the symbols in the first, second and third individual ones of the channels having a pre-selected number of binary bits, a line, first means for providing a higher priority to the symbols occurring periodically in the first and second individual ones of the channels than to the symbols occurring aperiodically in the third individual one of the channels and for providing higher priorities to the symbols occurring periodically in the first individual one of the channels at the higher rate than to the symbols occurring periodically in the second individual one of the channels at the lower rate, each group of successive symbols defining a character frame, each character frame being represented by a cumulative number of binary bits equal to the pre-selected number of the binary bits in each symbol multiplied by the number of symbols in each character frame, second means for forming each group of the successive symbols into each character frame, third means for reducing the cumulative number of binary bits in each character frame to a number of binary bits less by a particular value than the cumulative number without losing any of the information provided in the symbols in such character frame, and fourth means for introducing the character frames with the reduced number of binary bits from the different channels to the line for transmission through the line, and fifth means for providing a transmission through the line of the character frames with the reduced number of the binary bits in a priority determined by the first means for the symbols in the different channels.

2. In a combination as set forth in claim 1, the channels in the plurality constituting channels in a first plurality, sixth means for restoring the number of binary bits in each character frame to the particular number of binary bits for each of the symbols in the character frame after transmission of the character frame through the line, means defining a second plurality of channels, and seventh means for directing each symbol after restoration to an individual one of the channels in the second plurality in accordance with the priorities established by the first means for such symbol to provide each channel in the second plurality with only the symbols in an individual one of the channels in the first plurality.

3. In a combination as set forth in claim 1, the third means including register means for receiving the binary bits in the symbols in each character frame and further including sixth means for separating the binary bits in each symbol in the register means into first and second portions and further including latch means and also including seventh means for introducing the first portions of the symbols in each character frame, without change, into the latch means in adjacent relationship to one another in the latch means and including eighth means for reducing the number of binary bits in the second portions of the symbols in each character frame and for introducing such reduced number of binary bits to the latch means, and the fourth means including means for introducing the binary bits in the latch means to the line for transmission through the line.

4. In a combination as set forth in claim 1, including, means included in the first means for providing a first symbol in each of the first and second individual ones of the channels to indicate the start of the periodic symbols in such channel and to indicate the rate of occurrence of the periodic symbols in such channel and for providing a second symbol in each of the first and second individual ones of the channels to indicate the end of the periodic symbols in such channel, and the fifth means further including sixth means responsive to the first and second symbols for each of the first and second individual ones of the channels in the plurality for allocating the line during the period between the first and second symbols in such channel in accordance with the priority established for the periodic symbols in such channel by the indications, in the first symbol for each such channel, of the rate of occurrence of such periodic symbols in such channel.

5. In combination for providing for the transmission of symbols, a plurality of channels first individual ones of which provide symbols at periodicities individual to such channels and second individual ones of which provide aperiodic signals, a line, first means for providing symbols determining the start, periodicity and end of the periodic symbols in each of the first individual ones of the channels, second means for merging the symbols from each of the first individual ones of the channels into the line, during the period between the start and end of the periodic occurrence of the symbols in such channel, in accordance with the symbols provided by the first means in representation of the periodicity of the symbols in such channel and the start and end of such symbols, third means for storing the aperiodic symbols from the second individual ones of the channels sequentially in accordance with the relative times of occurrence of such symbols in such channels, and fourth means for providing a merging of the stored aperiodic symbols into the line in the times not used by the second means for the merging into the line of the periodic symbols in the first individual ones of the channels and in a sequence corresponding to the sequence in which such aperiodic symbols are stored in the third means.

6. In a combination as set forth in claim 5, each symbol in each of the channels in the plurality being formed from a plurality of binary bits and successive groups of symbols in each of the channels in the defining character frames in such channel, and means for coding the symbols in each character frame in each of the channels in the plurality to reduce the number of binary bits in such character frame without destroying any of the information represented by the binary bits in each symbol in such character frame.

7. In a combination as set forth in claim 5, the line constituting a first line, means including a second line for receiving the symbols in the sequence in the first line, means for providing a second plurality of channels, means for determining the received symbols having periodicity and the periodicity of such received symbols and for determining the received signals having an aperiodicity, and means for introducing the symbols having periodicity into individual ones of the channels in the second plurality in accordance with the periodicity of such symbols and for introducing the aperiodic signals into an additional channel in the second plurality.

8. In a combination as set forth in claim 6, the plurality of channels constituting a first plurality, means including a second line for receiving the sequence of character frames, means for restoring the symbols in each character frame to the particular number of binary bits in each symbol in the character frame, means for providing a second plurality of channels, means for determining the restored symbols having periodicities and the individual periodicities of such symbols and for determining the restored symbols having aperiodicities, and means for introducing the symbols having periodicities into individual ones of the channels in the second plurality in accordance with the periodicities of such symbols and for introducing the aperiodic signals into an additional channel in the second plurality.

9. In combination for providing for the transmission of symbols, a plurality of channels a first one of which provides symbols at a first periodicity, a second one of which provides symbols at a second periodicity different from the first periodicity and a third one of which provides aperiodic symbols, each of the first and second ones of the channels in the plurality providing an enable symbol indicating the start and the periodicity of the symbols in such channel, periodic allocation control means for passing the enable symbol for each of the first and second channels in the plurality, first means responsive to the enable symbols from the periodic allocation control means for producing a sequence of the symbols in the first and second channels in the plurality with a higher priority to the symbols in the first channel than to the symbols in the second channel, and second means responsive to the symbols from the first means and to the aperiodic symbols in the third channel in the plurality for producing a sequence of such symbols with a higher priority to the symbols from the first means than to the symbols from the third channel in the plurality.

10. In a combination as set forth in claim 9, register means for receiving and storing the aperiodic symbols from the third channel in the plurality, the second means being responsive to the symbols from the first means and the symbols from the register means for producing a sequence of such symbols with a higher priority to the symbols from the first means than to the symbols from the register means.

11. In a combination as set forth in claim 10, there being a fourth channel in the plurality for providing aperiodic symbols, the register means being operative to store the symbols from the third and fourth channels in the plurality in the same order as such symbols are provided by the third and fourth channels, the register means being operative to provide the stored symbols to the second means in the order of their storage in the second means.

12. In a combination as set forth in claim 11, the plurality of channels constituting a first plurality, a second plurality of channels, and means responsive to the symbols from the second means for introducing the symbols of the first periodicity to a first one of the channels in the second plurality, the symbols of the second periodicity to a second one of the channels in the second plurality and the aperiodic symbols to a third one of the channels in the second plurality.

13. In a combination as set forth in claim 10, each of the symbols in each of the channels being defined by a particular number of binary bits, third means for forming each group of the successive symbols in each individual one of the channels into a character frame, and fourth means for reducing the cumulative number of the binary bits in each character frame to a number of binary bits less by a particular value than the cumulative number without losing any of the information provided by the symbols in such character frame.

* * * * *